(12) United States Patent
Baldi

(10) Patent No.: US 6,193,814 B1
(45) Date of Patent: Feb. 27, 2001

(54) ACTIVATED METAL AND A METHOD FOR PRODUCING THE SAME

(75) Inventor: Alfonso L. Baldi, Jupiter, FL (US)

(73) Assignee: Alloy Surfaces Company, Chester Township, PA (US)

( * ) Notice: Subject to any disclaimer, the term of this patent is extended or adjusted under 35 U.S.C. 154(b) by 0 days.

(21) Appl. No.: 09/469,491

(22) Filed: Dec. 22, 1999

Related U.S. Application Data

(63) Continuation of application No. 08/861,593, filed on May 22, 1997, now Pat. No. 6,093,498.

(51) Int. Cl.[7] .................................................. C23C 22/00
(52) U.S. Cl. ........................ 148/240; 148/243; 148/279; 148/280
(58) Field of Search ..................................... 148/240, 242, 148/243, 248, 279, 280; 428/607; 149/37; 102/336

(56) References Cited

U.S. PATENT DOCUMENTS

| | | |
|---|---|---|
| 2,898,251 | 8/1959 | Treder et al. ....................... 148/6.35 |
| 4,141,760 | 2/1979 | Baldi ................................... 148/31.5 |
| 4,347,267 | 8/1982 | Baldi ................................... 427/237 |
| 4,435,481 | 3/1984 | Baldi ................................... 428/550 |
| 4,708,913 | 11/1987 | Baldi ................................... 428/607 |
| 4,824,482 | 4/1989 | Baldi ................................... 75/254 |
| 4,880,483 | 11/1989 | Baldi ................................... 149/6 |
| 4,895,609 | 1/1990 | Baldi ................................... 149/5 |
| 4,927,798 | 5/1990 | Baldi ................................... 502/301 |
| 5,077,257 | 12/1991 | Baldi ................................... 502/301 |
| 5,102,700 | 4/1992 | Baldi ................................... 427/383.7 |
| 5,128,179 | 7/1992 | Baldi ................................... 427/252 |
| 5,182,078 | 1/1993 | Baldi ................................... 419/9 |
| 5,464,699 | 11/1995 | Baldi ................................... 428/607 |
| 5,501,751 | 3/1996 | Baldi et al. ........................... 149/14 |

*Primary Examiner*—John Sheehan
*Assistant Examiner*—Andrew L. Oltmans
(74) *Attorney, Agent, or Firm*—Connolly Bove Lodge & Hutz LLP

(57) ABSTRACT

The present invention relates to the preparation of activated metal, particularly activated tinplate, and the activated metal itself. The activated metal is highly reactive with oxygen and can be used as a pyrophoric decoy material or as a catalyst.

20 Claims, 5 Drawing Sheets

ACTIVATED METAL AND A METHOD FOR PRODUCING THE SAME

CROSS-REFERENCE TO RELATED APPLICATION

The present application is a continuation of U.S. patent application Ser. No. 8/861,593 filed on May 22, 1997, now U.S. Pat. No. 6,093,498.

BACKGROUND OF THE INVENTION

1) Field of the Invention

The present invention relates to the preparation of activated metal, particularly tinplate, and the activated metal itself. The activated metal is highly reactive with oxygen and can be used as a pyrophoric decoy material or as a catalyst.

2) Description of the Prior Art

The closest prior art known to the applicant is commonly owned U.S. Pat. No. 4,895,609, the entire disclosure of which is expressly incorporated by reference into the present patent application. This U.S. Patent issued on Jan. 23, 1990, to the inventor of the present invention, and generally describes the preparation of activated metals by several techniques. One of those techniques is the activation of metal foil where the metal can be steel. However, this U.S. Patent does not expressly teach that the metal foil can be tin-plated steel, commonly known as "tinplate".

SUMMARY OF THE INVENTION

The present invention relates to the preparation of activated metal, particularly activated "tinplate", and the activated metal itself. The activated metal is highly reactive with oxygen and can be used as a pyrophoric decoy material or as a catalyst.

In the method of the present invention, tin-plated steel, sometimes referred to herein as "tinplate", is pyrophorically activated by depositing aluminum on the surface of the tinplate, either alone or as a mixture with other metal powders (e.g., iron powder), to form a coating on the tinplate and then heating the coated tinplate to cause the aluminum to react with iron and diffuse into the tinplate to form an aluminide coating on the tinplate followed by the removal of at least a portion of the aluminum that is contained in the coating. The aluminum can be applied to the tinplate as a powder dispersion, foil laminate or electrolytic deposit of aluminum. Upon heating the aluminum coated tinplate to temperatures of about 700° to 930° C., the lower melting tin (mp about 232° C.) on the surface of the steel enables excellent wetting and uniform diffusion of the higher melting aluminum (mp about 660° C.) into the tin-plated steel surface to form the aluminide coating.

Upon exposure to oxygen, the activated tinplate provides self-igniting pyrophoric elements which are very suitable for decoying heat seeking missiles.

The superior lubricity, corrosion and oxidation resistance of tinplate as well as the presence of a small amount of tin in the aluminide coating enables a more effective and more economically produced pyrophoric material than uncoated steel. Aluminide coated tinplate is also desirable in that it demonstrates a unique combination of high temperature oxidation resistance and corrosion resistance in comparison to either uncoated tinplate or aluminide coated steel (i.e., uncoated steel that has been coated with an aluminide).

DEFINITIONS

A "mil" is a unit of measurement equal to one thousandth of an inch.

The term "Sn—Fe intermetallic" or "tin-iron intermetallic" as used herein is intended to encompass any combination of tin and iron where the tin molecules are bound, either chemically or physically, to iron molecules.

DETAILED DESCRIPTION OF THE INVENTION

Figure 1:
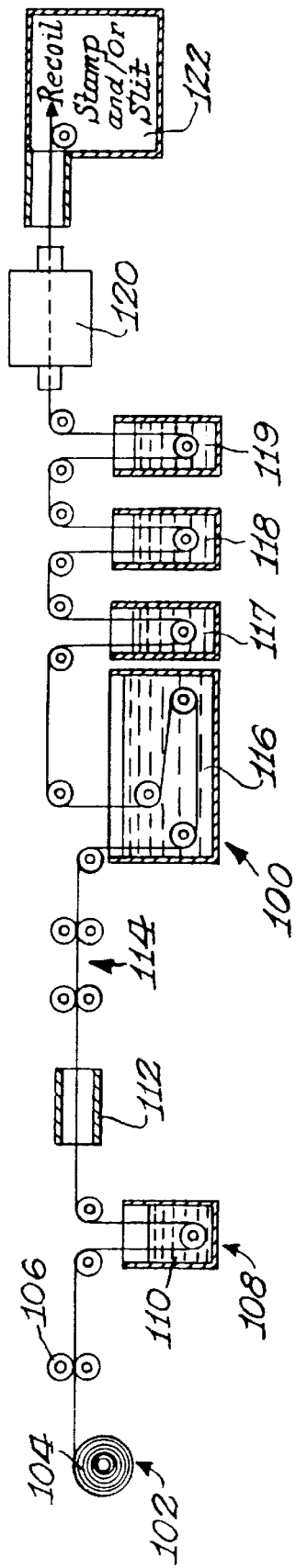
FIG. 1 is a schematic production line for producing the activated metal of the present invention.

The present invention relates to the preparation of activated metal, particularly activated "tinplate", and the activated metal itself. The activated metal is highly reactive with oxygen and can be used as a pyrophoric decoy material or as a catalyst.

In the method of the present invention, tin-plated steel, sometimes referred to herein as "tinplate", is pyrophorically activated by depositing and diffusing aluminum into the tinplate to form an aluminide coating on the tinplate followed by the removal of at least a portion of the aluminum that is contained in the coating. The aluminum can be applied to the tinplate as a powder dispersion, foil laminate or electrolytic deposit of aluminum. Upon heating the aluminum coated tinplate to temperatures of about 700° to 930° C., the lower melting tin (mp about 232° C.) on the surface of the steel enables excellent wetting and uniform diffusion of the higher melting aluminum (mp about 660° C.) into the tin-plated steel surface to form the aluminide coating.

Upon exposure to oxygen, the activated tinplate provides self-igniting pyrophoric elements which are very suitable for decoying heat seeking missiles.

The superior lubricity, corrosion and oxidation resistance of tinplate as well as the presence of a small amount of tin in the aluminide coating enables a more effective and more economically produced pyrophoric material than uncoated steel. Aluminide coated tinplate is also desirable in that it demonstrates a unique combination of high temperature oxidation resistance and corrosion resistance in comparison to either uncoated tinplate or aluminide coated steel (i.e., uncoated steel that has been coated with an aluminide).

Tin-plated steel, which is generally referred to as "tinplate" and sometimes referred to as "ETP" (Electrolytic Tin Plate), is generally composed of a steel substrate that bears a coating of tin. The tin-plated steel is available from commercial steel mills in a variety of thicknesses, including very thin foils. For example, ETP is readily available from commercial steel mills in thicknesses of from 0.0055 inches to 0.0149 inches. The nominal thickness of the tin layer on the steel substrate is generally varied from 0.08 mils to less than 0.006 mils. The thickness of the tinplate can be further reduced by typical methods known in the art, such as by rolling. By the use of these thickness reducing methods, the thickness of the tinplate can be reduced to less than 0.001 inches (i.e., one mil), even to less than 0.0005 inches, with a corresponding reduction in the thickness of the tin coating. Suitable tin coating thicknesses range from about 0.003 mils to 0.10 mils.

Tin-plated steel is normally used in industry for the production of containers, such as cans for foodstuffs. Because of the huge quantity of tinplate that is made every year, the cost of this metal is low. Therefore, if it could be activated so as to be pyrophoric, it would be an attractive metal for use in the preparation of activated metal bodies.

In addition, for many purposes it would be desirable to provide aluminum coated steel in the form of sheet, strip and wire. However, it is very difficult to obtain a good bond between aluminum and a ferrous metal such as iron or steel. In U.S. Pat. No. 2,898,251 to Treder et al., it was shown that the direct application of aluminum to steel results in a defective and uneven layer having a tooth-like appearance which cracks or peels off upon deformation. Treder et al. remedy this problem by precarburizing the steel prior to aluminizing so as to enable good aluminum adherence as well as a good formable bimetallic material. However, this process is expensive in that it requires the precarburizing step.

An inexpensive method has now been discovered for producing a material that has excellent properties that are equivalent or superior to the properties of aluminum coated steel. The material produced by this method can be used for many applications that require excellent oxidation and corrosion resistance. In addition, the material can be further processed into an activated metal by subjecting the material to a leaching step to remove at least a portion of the aluminum that is located in the material.

The material of the present invention is prepared by placing a body of aluminum metal in contact with the tin coating layer on a substrate of tin-plated steel to form a tinplate/aluminum system and then heating the system to a temperature sufficient to diffuse the aluminum into the underlying steel to provide a ductile, uniform and adherent aluminide coating on the surface of the steel substrate. The aluminide coated tinplate demonstrates a unique combination of high temperature oxidation resistance and corrosion resistance in comparison to either uncoated tinplate or aluminide coated steel (i.e., uncoated steel that has been coated with an aluminide). The corrosion resistance of the aluminide coated tinplate can be further improved by incorporating galvanic protecting elements such as zinc and/or magnesium powder mixed with the aluminum powder prior to the heating step.

The aluminide coated tinplate can be further processed to obtain a pyrophoric material. The further processing includes the step of leaching the aluminide coated tinplate in an aqueous caustic bath to remove at least a portion of the aluminum that is contained in the aluminide layer. After the leaching step, the material is normally washed or rinsed with water and allowed to dry, at which time the now activated material becomes pyrophoric (i.e., once dry, the material will spontaneously react with oxygen in the air and liberate large amounts of heat).

When the activated tinplate is to be used as a pyrophoric material, the coating weight of aluminum on the surface of the tinplate should be sufficient so that the amount of aluminide that forms when the aluminum coated tinplate is heated to temperatures of about 700° to 930° C. is sufficient to create a pyrophoric effect after the aluminide coated tinplate is leached in an aqueous caustic solution and then dried and exposed to air. In a preferred embodiment of the present invention, the amount of aluminum that is present on the surface of the tinplate before the heating step is in the range of from 1.0 to 25 mg/cm$^2$.

When the heat output properties of activated tinplate samples were compared to activated steel samples that had been prepared in an identical manner, the activated tinplate achieved a higher peak temperature and a longer heat generation time. In addition, the activated tinplate showed a completely different relationship between the length of time that the samples were subjected to leaching and the heat energy output of the samples. Specifically, as shown in Example 4, Table 2, the activated steel samples showed a gradual loss of energy as the leaching time increased whereas the activated tinplate samples showed an initial increase in energy output as the leaching time increased and then a generally slower decline in energy output as the leaching time continued to increase. At all leaching times, the activated tinplate generated a much greater energy output than the activated steel. This characteristic of the activated tinplate (i.e., the ability to withstand longer leaching times without losing energy output) provides a processing advantage over activated steel in that it provides increased flexibility to the leaching step of the process. For example, with activated steel, the time of leaching must be carefully measured and limited to a relatively short amount of time. This means that the personnel that are operating the leaching bath are constantly attending to the leaching bath while it is in operation. In addition, a larger amount of scrap material is produced due to material that has been improperly leached. In contrast, since the activated tinplate is much less sensitive to the time of leaching, there is no need to constantly monitor the leaching bath and this allows the personnel that operate the leaching baths to attend to other tasks while the activated tinplate is in the leaching bath. Moreover, when the process is run as a continuous process, there is a greater amount of flexibility as to the equipment that can be used in the leaching step.

In example 11, Table 11, the activated steel foil samples were compared to activated tinplate samples that have been prepared according to example 7 for the steel foil and example 8 for the tinplate foil. In both cases, after leaching, five (5) specimens each of activated steel and activated tinplate both were kept in the water rinse bath for the indicated number of hours. The activated steel exhibited substantial deterioration as reflected by substantial lowering of the emitted heat energy, peak temperature and dwell time at 400° C. compared to the appreciably more stable activated tinplate.

In addition to the above, there are several other more direct processing advantages that are obtained when tinplate is used as the metal that is to be activated. For example, it has been accepted for some time in this art that to activate a steel substrate, it is important to add iron powder to the aluminum powder that is placed on the surface of the steel substrate, so that a uniform iron aluminide coating is obtained on the steel foil. During the heating operation, the iron powder reacts exothermically with some of the aluminum powder and moderates the diffusion of any free aluminum into the steel surface. This process relies on an initial or complete reaction of the aluminum powder with the iron powder. To achieve a good reaction between the aluminum powder and the iron powder, it was highly preferred to use expensive finely divided spherical aluminum powder having a particle size of about 3–5 microns. Moreover, it was also highly preferred that the leaching bath contained a stannous salt, which was also very expensive, to prevent oxidation of the actively produced iron because the presence of any oxidized iron lowers the heat output of the final pyrophoric body.

In the process of the present invention, wherein tinplate is used as the substrate to be activated, it is only necessary to add aluminum to the tinplate before the heating step (i.e., it is not necessary to add iron to the aluminum). Moreover, excellent results can be obtained using a substantially less expensive granular aluminum powder having a particle size of about 5–10 microns rather than the expensive spherical smaller particle size aluminum powder used in the prior art. Although the applicant does not wish to be bound by any theory, it is believed that the low melting tin layer on the surface of the tinplate combines with the aluminum during the heating step to enable the aluminum to uniformly wet and diffuse into the steel beneath the tin surface layer. This results in a ductile, uniform and adherent aluminide coating on the steel. The ability of the aluminum/tin combination to wet and diffuse into the steel may be the result of a eutectic that is formed between the tin and the aluminum, since it is known that tin and aluminum form a eutectic having a melting point of about 228° C., compared to pure tin which has a melting point of about 232° C. and pure aluminum which has a melting point of about 660° C. For whatever reason, uncoated steel or iron, which has a melting point of about 1535° C., is much more resistant to wetting and diffusion by aluminum.

Another processing advantage obtained by using tinplate as the metal to be activated is that there is no need to add the expensive stannous salt to the leaching bath to prevent oxidation of the iron during the leaching and rinsing procedure. Apparently, the tin in the aluminide coated tinplate provides sufficient protection to the iron during the leaching and rinsing steps. Experiments have shown that the heat output profile of the activated tinplate samples does not change significantly if the stannous salt is added to the leaching bath whereas the heat output profile of activated steel samples (i.e., where the substrate is uncoated steel) is greatly improved by the addition of the stannous salt to the leaching bath. It is believed that when the stannous salt is not present in the leaching bath, the sodium hydroxide in the leaching bath can cause conversion of the activated iron on the surfaces of the uncoated steel substrate to ferrite or ferrate and thereby lower the subsequent energy output during the reaction of the iron aluminide coating with oxygen in the air. However, when the stannous salt is present in the leaching bath, it is believed that elemental tin is deposited in the matrix of the iron aluminide coating. Quantitative Electron Probe Microanalysis has shown that when a spent pyrophoric coating is formed by applying a coating of a powder mixture containing primarily aluminum and iron powder to the surface of a steel substrate and then heating the coated substrate to an elevated temperature to react the iron with the aluminum and cause slight diffusion of the aluminum into the surface of the substrate before removing the excess aluminum in the coating by subjecting it to leaching in a leaching bath (20% NaOH in water) containing a stannous salt, and then exposing the leached coating to air, the spent pyrophoric coating will have a much larger content of tin (e.g., in some cases more than 10 times as much tin) than a spent pyrophoric coating that was formed on a tinplate substrate that was leached in a bath that did not contain the stannous salt. The deposited elemental tin in the iron aluminide coating that results from the stannous salt in the leaching bath prevents the oxidation of the activated iron by the NaOH. During water rinsing, however, the elemental tin in the matrix of the leached iron aluminide coating can be cathodic to the activated iron and enhance the oxidation of the activated iron during the water rinsing step. In the case of an activated tinplate body, it is believed that the tin in the coating layer (i.e., the pyrophoric coating layer) is not present as elemental tin but rather as a tin-iron intermetallic that is close to the potential of the activated iron. Therefore, this tin-iron intermetallic protects the activated iron from oxidation during the leaching step and has little or no effect in oxidizing the activated iron during the water washing step. Moreover, the leaching of aluminide coated tinplate requires less time than the leaching of aluminide coated steel (e.g., in many instances, only about three-quarters of the leaching time). Still further, the tin in the pyrophoric coating on activated tinplate does not leach out into the leaching bath or the rinsing bath. In contrast, when the activated coating on steel substrates is subjected to leaching, it is necessary to add a stannous salt to the leaching bath which results in a build-up of sludge in the leaching bath over time which must be removed and disposed of as industrial waste. Further, after the coated steel substrate is removed from the leaching bath containing the stannous salt and placed in the water rinsing bath, some of the tin that is present on the surfaces of the activated coating and in the activated coating washes or leaches out into the rinsing bath, creating another sludge that must be removed and disposed of as industrial waste. This property of the activated tinplate is very beneficial because the fouling of the leaching and water rinsing baths with tin is an economical and environmental problem.

Another processing advantage is that since it is only necessary to add aluminum to the tinplate before the heating step (i.e., there is no need to add iron to the aluminum), the aluminum can be added as aluminum foil (e.g., aluminum foil can be laminated onto the surface of the tinplate) or the aluminum can be electroplated onto the tinplate.

Additional benefits that are obtained from the use of tinplate are: (1) it is easier to reduce the thickness of tinplate and thinner cross-sections can be obtained due to the increased lubricity of tinplate in comparison to uncoated steel; and (2) the superior corrosion and oxidation resistance of tinplate compared to uncoated steel enables a more economical and easier handling of the tinplate during the various coating, heating, leaching, rinsing and drying steps of the present process.

As mentioned above, the superior corrosion and oxidation resistance of tinplate compared to uncoated steel makes the handling of the tinplate during the various processing steps easier and more economical. For example, uncoated steel will start to oxidize if exposed to the humidity in ambient air for even a day or two. After several days, the surface of the uncoated steel will become heavily oxidized. Since any oxidation on the surface of the steel will reduce the heat output of the final activated steel, measures must be taken to avoid this oxidation, such as controlled environment storage rooms or oil coatings on the surface of the steel. However, even these measures are not completely effective at preventing surface oxidation of the steel. In contrast, tinplate will not oxidize significantly unless it is exposed to very humid conditions for an extended period of time. This property of tinplate eliminates the need for the protective measures used with uncoated steel which leads to cost savings and manufacturing flexibility.

Regardless of whether tinplate or uncoated steel substances are used, it is generally desirable to clean the surfaces of the substrate that are to be activated. This cleaning can be accomplished by dipping the substrates in a solvent (e.g., acetone), or by the electrolytic cleaning of the substrates in an alkaline water solution, or by heat cleaning the substrate (i.e., heating the substrate to an elevated temperature to remove surface contaminants). After the surfaces of the substrates are cleaned, the uncoated steel substrate is easily rusted and must be coated with the aluminide forming mixture and heated rapidly to avoid the substantial decrease in heat output that results from the premature oxidation or rusting of the substrate surface. In contrast, the tinplate is highly resistant to oxidation or rusting even after its surfaces are cleaned. This makes the tinplate easier to handle during processing to form the activated product and helps to explain the higher heat energy output demonstrated by the activated tinplate.

In addition to the aluminum powder, small amounts of other elements may be added with the aluminum, or as an addition to the aluminide surface after the leaching step, to alter the infrared output characteristics of the pyrophoric tinplate. For example, titanium, zirconium and boron powder can be added to shift the infrared output to the smaller bands of the infrared range of the electromagnetic spectrum and result in an enhancement of the higher temperature emission of the pyrophoric tinplate. Chromium, phosphorous or manganese powder can be added to enhance the lower temperature emission of the pyrophoric tinplate because of a shift to the longer bands of the infrared range of the electromagnetic spectrum.

Although it is not necessary to add additional metal powders with the aluminum powder to the surface of the tinplate substrate to form the aluminide coating, the use of additional powders (e.g., iron powder) can be desirable.

In a preferred embodiment of the present invention, the pyrophoric tinplate is prepared by applying to the surface of the tinplate a powder mixture containing aluminum and at least one other substance selected from the group consisting of iron, nickel, cobalt, boron and copper.

The aluminum powder or mixture of aluminum powder with other metal powders (such as iron powder) used to form the iron aluminide coating on the surface of the tinplate substrate can be applied as a dispersion or slurry of the metal powder(s) in a liquid. The liquid preferably includes a binder and a solvent, which may be an organic solvent or water. Examples of preferred binder/solvent systems are nitrocellulose/acetone systems, acrylate resin/acetone systems and polyvinyl alcohol/water/normal propanol systems. The dispersion or slurry of the metal powder(s) in a liquid can be applied to the tinplate substrate by dipping, spraying, painting, coating or any other suitable technique for applying a coating of a dispersion or slurry to a substrate.

When additional substances are added with the aluminum, or as an addition to the aluminide surface after the leaching step, such as the above-described substances (e.g., at least one of titanium, zirconium, boron, chromium, tantalum, phosphorous, manganese, iron, nickel, cobalt and copper), the additional substances are generally added in amounts of from 0.1 to 10% by weight, preferably from 0.1 to 5% by weight, based on the weight of the aluminum that was applied to the surface of the tinplate.

In a preferred embodiment of the present invention, the steel substrate is composed of low carbon steel and the tin coating is a precisely controlled electrolytically applied layer of tin.

In another preferred embodiment of the present invention, the tinplate is in the form of a foil that has a thickness of from about 0.0005 to 0.006 inches and the thickness of the tin coating is from about 0.003 mil to 0.10 mil.

In another preferred embodiment of the present invention, a Raney type layer is formed on the surface of the tinplate. A Raney type layer is a layer that when leached with aqueous caustic becomes pyrophoric. The combinations of metals that will form Raney type layers is well known in the art. A preferred Raney type layer for use in the present invention is formed by mixing nickel and aluminum powders having particle sizes of from about 0.5 to 12 microns in a proportion of about 3 atoms of aluminum to 1 atom of nickel. This mixture of aluminum and nickel is applied to the surface of the tinplate and the aluminum and nickel are reacted with each other by heating the mixture to temperatures of about 300° to 600° C. At this temperature, the aluminum and nickel react with each other exothermically with sufficient heat liberation to raise the temperature of the mixture to above 750° C. and thereby sinter the reacted mixture to the tinplate. Iron powder can be substituted for the nickel powder, preferably with a iron-aluminum atom ratio of 1:9 to 3:2, and similar results are obtained. Cobalt can also be substituted for the nickel, without changing its proportion to aluminum. The mixture that is used to form the Raney type layer can be applied to the tinplate substrate in the form of a slurry by using a suitable carrier liquid (e.g., a 2% solution of polyethylacrylate in methyl chloroform; a 3% solution of nitrocellulose in acetone; a 5% solution of acrylate in acetone; or a mixture of 47.5% water, 2.5% polyvinyl alcohol and 50% normal propanol).

Several preferred methods of forming Raney type layers on metal substrates are disclosed in U.S. Pat. Nos. 4,895,609 and 5,464,699, which issued on Jan. 23, 1990 and Nov. 7, 1995, respectively. The entire disclosures of both of these commonly owned patents are expressly incorporated herein by reference.

The tinplate substrate can have virtually any shape. Preferred shapes are discs, wire, screen, coils, foil and perforated metal sheets. In addition, although it is preferred to use commercially available tinplate as the substrate (i.e., for economic reasons), it is possible to produce tin plated steel of various shapes and steel substrate/tin layer thicknesses by purchasing uncoated steel and subsequently applying the tin layer (e.g., by electrolytic methods).

It is possible to reduce the thickness of the aluminide coated tinplate by methods known in the art (e.g., by rolling). It is preferred to reduce the thickness of the aluminide coated tinplate after the aluminide layer has been formed and before the leaching step. However, it is possible to reduce the thickness of the aluminide coated tinplate after the leaching step as long as suitable precautions are taken to prevent the leached body from drying out in the presence of oxygen. As discussed earlier, it is possible to reduce the thickness of the tinplate to less than 0.001 inches, even to less than 0.0005 inches. Similarly, it is possible to reduce the thickness of the aluminide coated tinplate to less than 0.0005 inches. In a preferred embodiment of the present invention, the aluminide coated tinplate is in the form of a flat plate, disc, foil, or perforated sheet and has a thickness of from about 0.0005 inches to 0.015 inches before the leaching step. In a highly preferred embodiment of the present invention, where the activated tinplate is to be used as a decoy material, the activated tinplate has a thickness of about 0.0005 inches to 0.006 inches after the leaching step.

Figure 2:
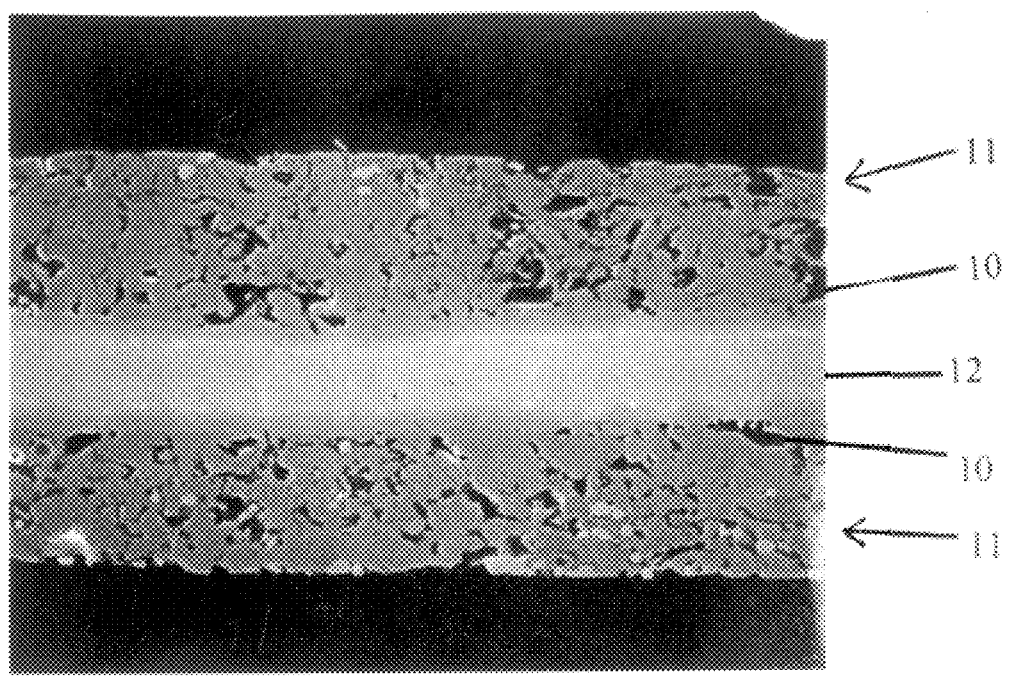
FIG. 2 is a photomicrograph taken at 500× magnification of a pyrophoric coating (before leaching) on an uncoated steel substrate.
Figure 3:
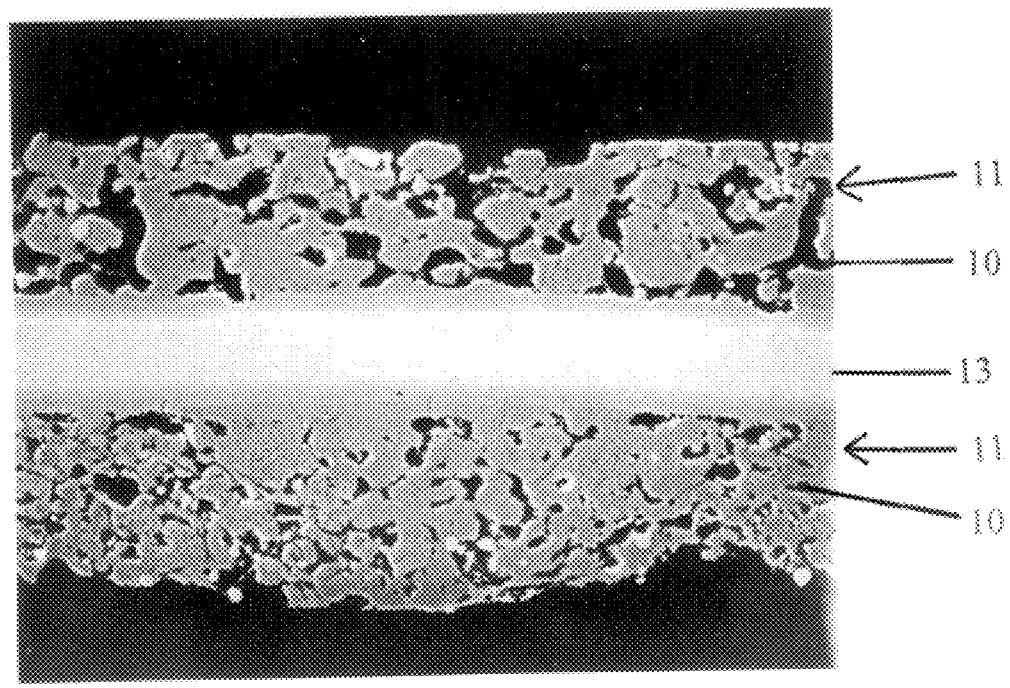
FIG. 3 is a photomicrograph taken at 500× magnification of a pyrophoric coating (before leaching) on a tinplate substrate.

Although applicant does not wish to be bound by any theory, it is believed that the improved properties demonstrated by the pyrophoric tinplate result from the increased porosity that is formed when tinplate is used as the substrate metal rather than normal uncoated steel. Applicant has discovered that when tinplate is used as the substrate metal rather than uncoated steel, the average size of the pores in the pyrophoric layer is significantly larger than the average size of the pores in an otherwise identical pyrophoric layer that is formed on normal uncoated steel. Further, the pore density in the pyrophoric layer formed on the tinplate substrate is also significantly greater than the pore density of an otherwise identical pyrophoric layer formed on a normal uncoated steel substrate. This can be seen by comparing FIGS. 2 and 3, where the porosity 10 in the pyrophoric layers 11 (before leaching) located on the surfaces of a normal uncoated steel substrate 12 (FIG. 2) and a tinplate substrate 13 (FIG. 3) is clearly different. Specifically, the porosity 10 in the pyrophoric layers 11 located on the surfaces of the tinplate substrate 13 (FIG. 3) is much larger than the porosity 10 in the pyrophoric layers 11 located on the surfaces of the uncoated steel substrate 12 (FIG. 2). Further, the pore density in the pyrophoric layer shown in FIG. 3 is much greater than the pore density in the pyrophoric layer shown in FIG. 2. The pyrophoric layers shown in FIGS. 2 and 3 were formed by using identical powder mixtures (i.e., mixtures primarily containing iron and aluminum powders) on the surfaces of the tinplate and uncoated steel substrates. Both substrates were 1 mil thick and the application and processing of the powder mixtures to form the pyrophoric layers on the surface of each substrate was identical (i.e., very similar to the process used in Examples 7 and 8). Specifically, after the metal powder mixture was coated on the substrate surfaces, the coated substrate was heated to an elevated temperature to cause reaction between the iron and aluminum powders and a slight diffusion of aluminum into the surface of the substrate. FIGS. 2 and 3 are photomicrographs taken at 500× magnification. The largest pore shown in FIG. 2 is about 10 microns in size whereas the largest pore shown in FIG. 3 is about 30 microns in size. Further, the pore density shown in FIG. 3 is about 3 times as great as the pore density shown in FIG. 2.

Figure 4:
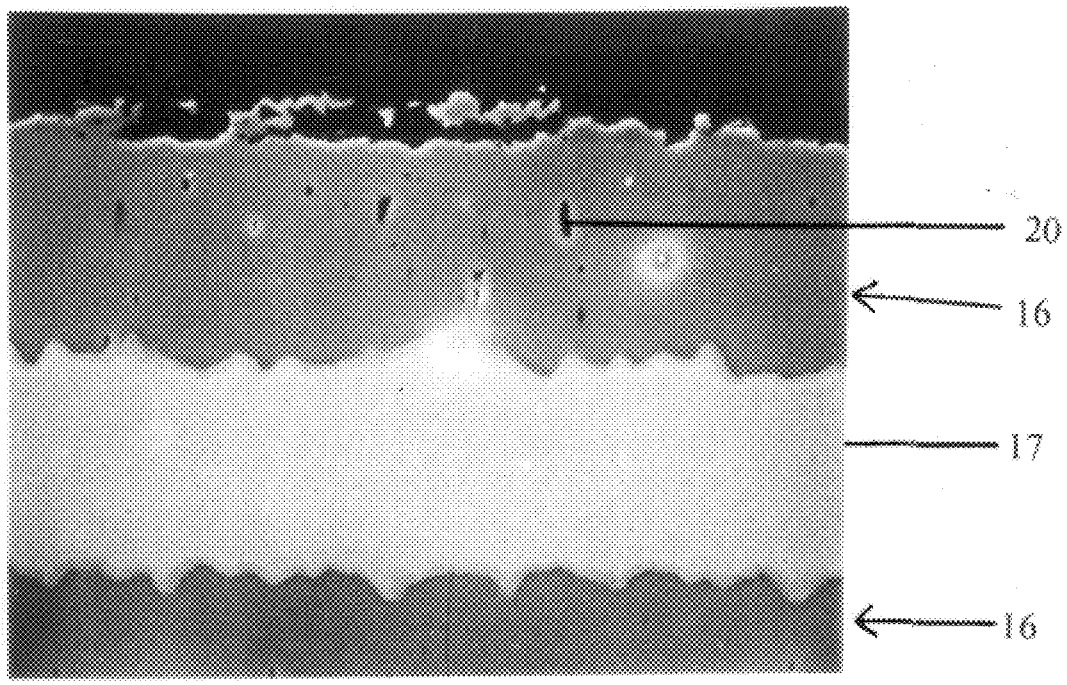
FIG. 4 is a photomicrograph taken at 1000× magnification of a pyrophoric coating (before leaching) on an uncoated steel substrate.

FIG. 4 is a photomicrograph taken at 1000× magnification of a pyrophoric coating 16 (before leaching) on the surfaces of an uncoated steel substrate 17 which is 1.5 mil thick.

Figure 5:
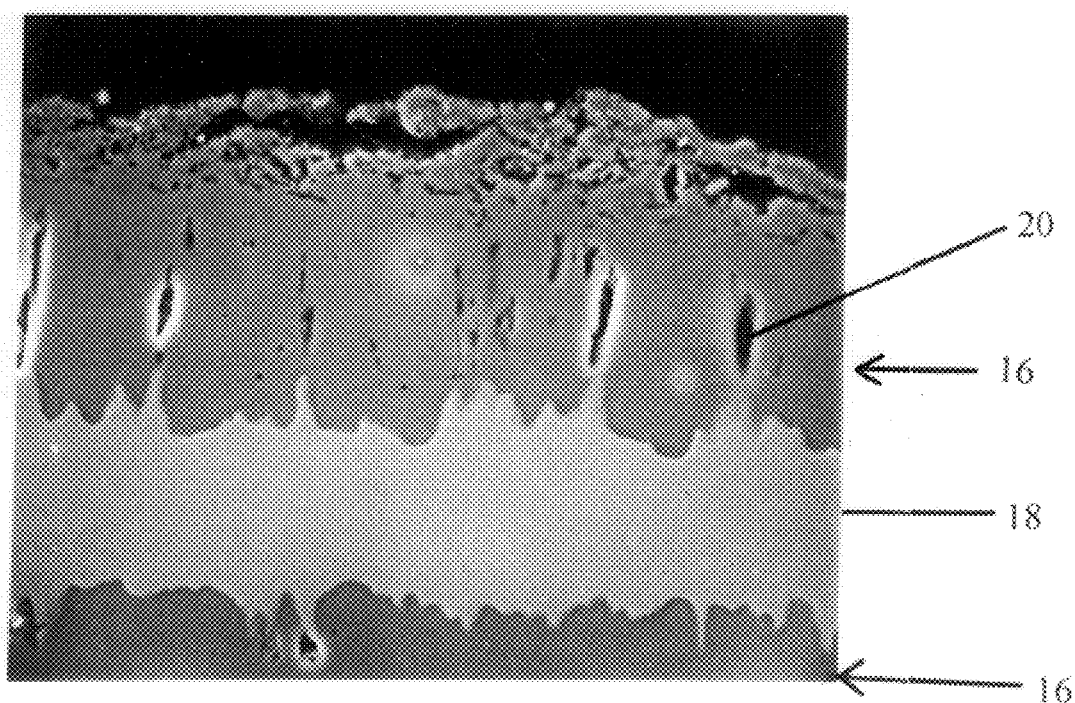
FIG. 5 is a photomicrograph taken at 1000× magnification of a pyrophoric coating (before leaching) on a tinplate substrate.

FIG. 5 is a photomicrograph taken at 1000× magnification of a pyrophoric coating 16 (before leaching) on the surfaces of a tinplate substrate 18 which is 1.5 mil thick.

The porosity in the pyrophoric coating 16 in FIGS. 4 and 5 is shown as 20. A comparison of FIGS. 4 and 5 shows that the pores in FIG. 5 are much larger and more numerous than the pores in FIG. 4. Specifically, the largest pore shown in FIG. 4 is about 5 microns in size and the largest pore shown in FIG. 5 is about 15 microns in size. Moreover, the pore density in FIG. 5 is about 3 times as great as the pore density in FIG. 4.

The pyrophoric coating on the steel and tinplate substrates shown in FIGS. 4 and 5 was formed by reacting aluminum and iron powders on the surface of each substrate at elevated temperatures with a significant diffusion of molten aluminum into the surfaces of each substrate (i.e., the process was very similar to the process used in Examples 9 and 10). The same amounts of aluminum and iron and the same processing steps were used to form the pyrophoric layers shown in FIGS. 4 and 5.

Figure 6:
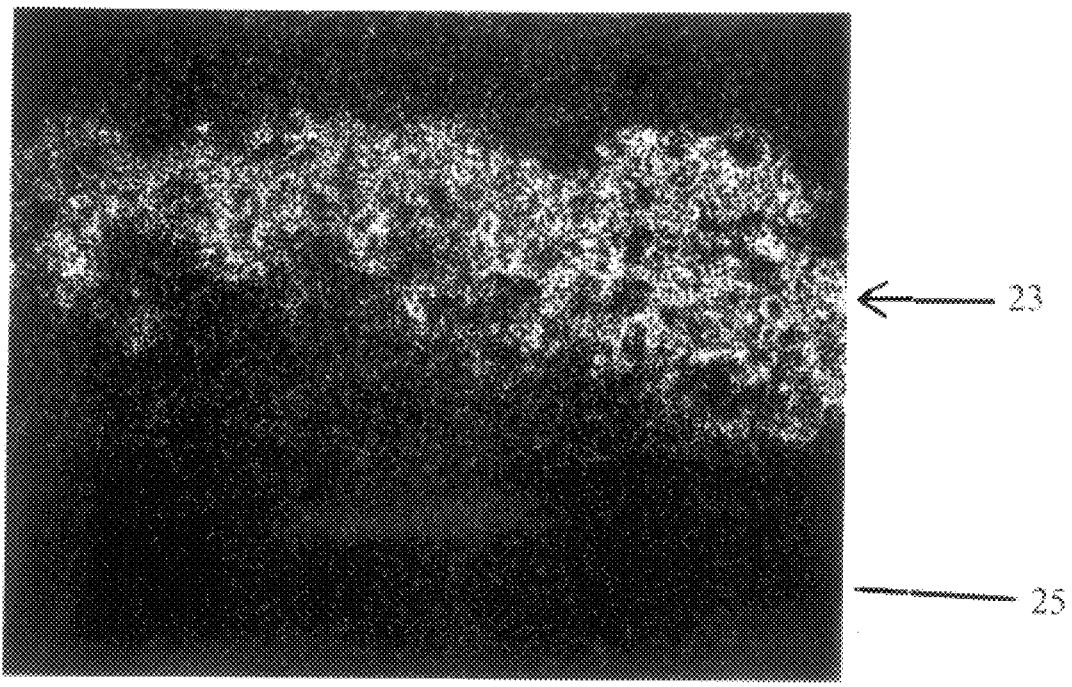
FIG. 6 is a photomicrograph taken at 1000× magnification of a spent pyrophoric coating on an uncoated steel substrate.
Figure 7:
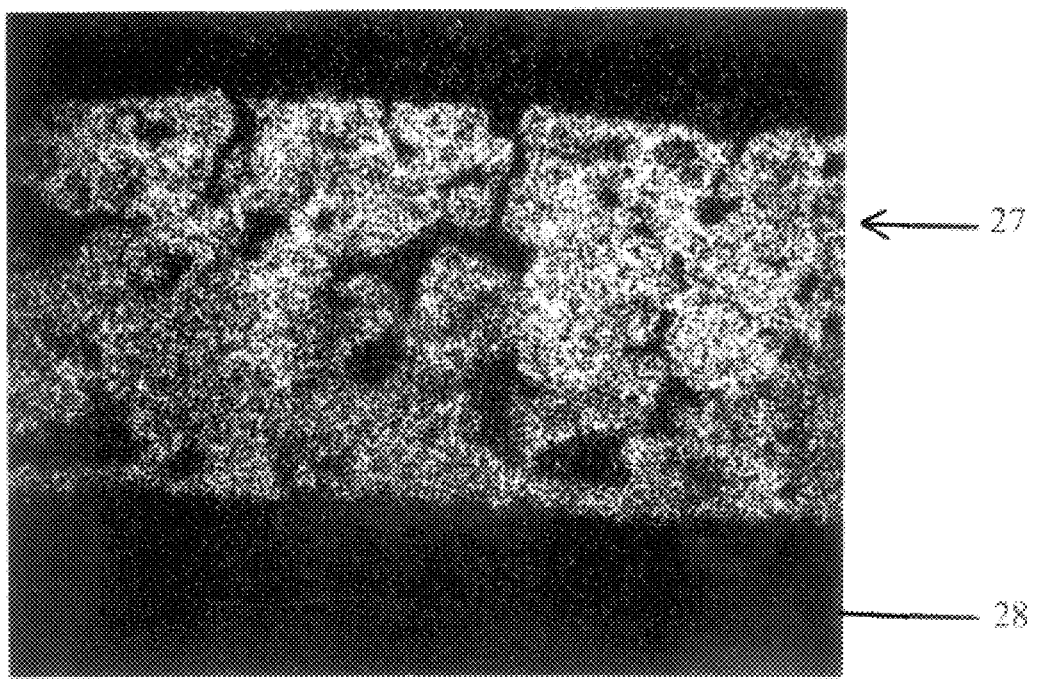
FIG. 7 is a photomicrograph taken at 1000× magnification of a spent pyrophoric coating on a tinplate substrate.
Figure 8:
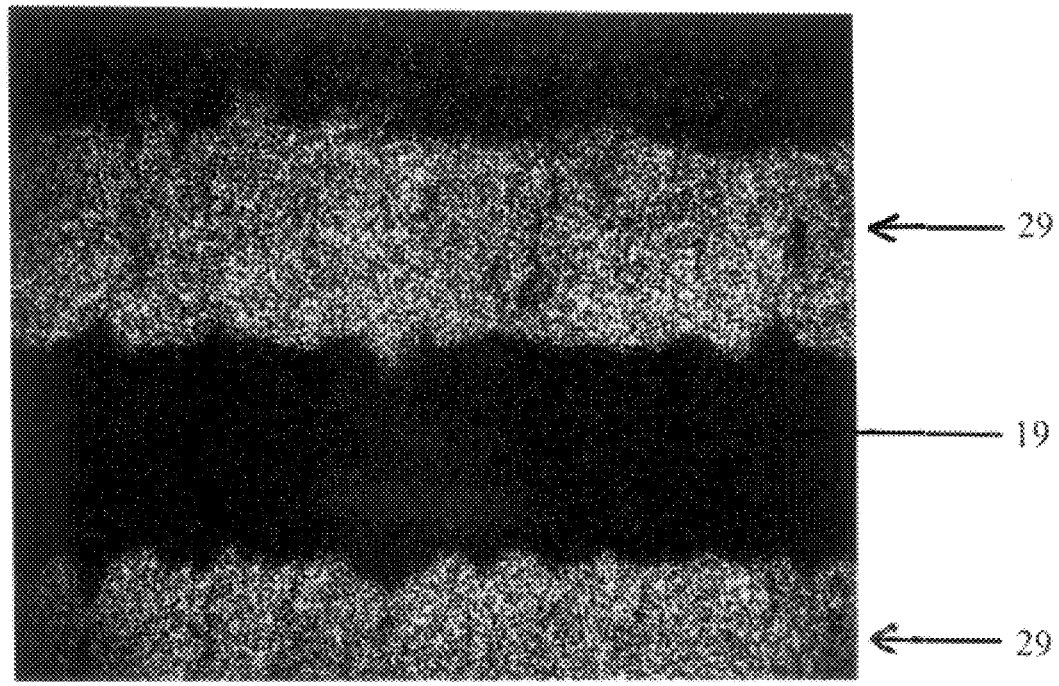
FIG. 8 is a photomicrograph taken at 1000× magnification of a spent pyrophoric coating on an uncoated steel substrate.
Figure 9:
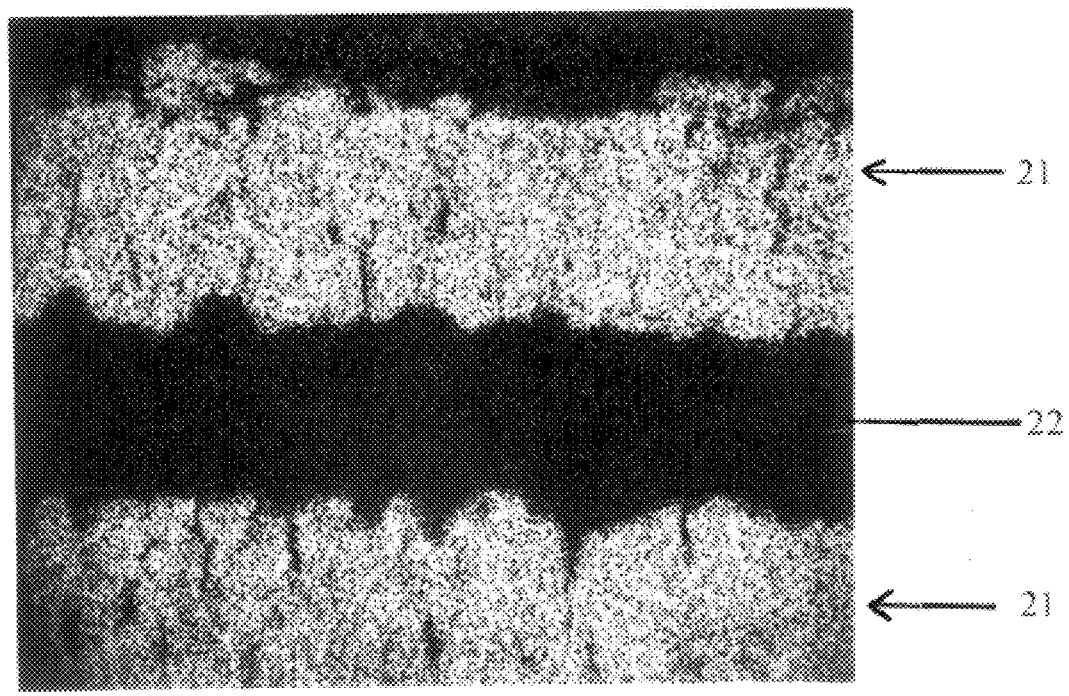
FIG. 9 is a photomicrograph taken at 1000× magnification of a spent pyrophoric coating on a tinplate substrate.

The larger and more numerous pores in the pyrophoric coatings on the tinplate substrates as compared to the otherwise identical pyrophoric coatings on the normal uncoated steel substrates results in the pyrophoric coatings on the tinplate substrates having a greater activity (i.e., reaction with air) after the leaching step than the pyrophoric coatings on the normal uncoated steel substrates. This is demonstrated by a comparison of FIGS. 6 and 7 or 8 and 9. FIG. 6 is a photomicrograph at 1000× magnification of a spent pyrophoric coating 23 (i.e., after leaching, washing and reaction with air) on a 1 mil thick normal uncoated steel substrate 25. FIG. 7 is a photomicrograph at 1000× magnification of a spent pyrophoric coating 27 (i.e., after leaching, washing and reaction with air) on a 1 mil thick tinplate substrate 28. The pyrophoric coatings on the substrates shown in FIGS. 6 and 7 were formed by identical methods from identical starting materials (i.e., a powder mixture containing primarily iron and aluminum powder was coated on the surfaces of the substrates and then heated to an elevated temperature to cause reaction of the aluminum and the iron and slight diffusion of the aluminum into the substrates, in a process very similar to that used in Examples 7 and 8). Further, the leaching, washing and oxidation (i.e., reaction with air) steps that the pyrophoric coatings were subjected to were also identical and were very similar to those used in Examples 7 and 8. FIG. 8 is a photomicrograph at 1000× magnification of a spent pyrophoric coating (i.e., after leaching, washing and reaction with air) on a 1.5 mil thick normal uncoated steel substrate. FIG. 9 is a photomicrograph at 1000× magnification of a spent pyrophoric coating (i.e., after leaching, washing and reaction with air) on a 1.5 mil thick tinplate substrate. The pyrophoric coatings on the substrates shown in FIGS. 8 and 9 were formed by identical methods from identical starting materials (i.e., a coating of a mixture of aluminum and iron powders was coated on the surface of the substrates and then the coated substrates were heated to cause reaction of the aluminum with the iron and significant diffusion of the aluminum into the surface of the substrates in a process very similar to that used in Examples 9 and 10). Further, the leaching, washing and oxidation (i.e., reaction with air) steps that the pyrophoric coatings were subjected to were also identical and very similar to the steps used in Examples 9 and 10.

A comparison of FIGS. 6 and 7 shows that the oxidation of the pyrophoric coating on the normal uncoated steel substrate (FIG. 6) was nonuniform and incomplete whereas the oxidation of the pyrophoric coating on the tinplate substrate (FIG. 7) was much more uniform and complete, as shown by the intensity and definition of the gray colored areas which represent the oxidized areas. similarly, a comparison of FIGS. 8 and 9 shows that the oxidation of the pyrophoric coating 21 on the tinplate substrate (shown as 22 in FIG. 9) was much more uniform and complete than the oxidation of the pyrophoric coating 29 on the normal uncoated steel substrate (shown as 19 in FIG. 8).

In view of the above, it is clear that the pyrophoric coatings formed on the tinplate substrates are markedly superior to the otherwise identical pyrophoric coatings formed on the normal uncoated steel substrates. Additional data which demonstrates the superiority of pyrophoric coatings formed on tinplate rather than normal uncoated steel is provided below.

Quantitative Electron Probe Microanalysis of the activated tinplate and normal uncoated steel substrates showed that in the coatings that were formed by applying a coating of a powder mixture containing primarily aluminum and iron powder to the surfaces of the substrates and then heating the coated substrate to an elevated temperature to react the iron with the aluminum and cause slight diffusion of the aluminum into the surface of the substrate and before removing the excess aluminum in the coatings by subjecting the coatings to leaching in a leaching bath (e.g., an aqueous bath containing about 20% by weight NaOH), there was 0.58% by weight tin distributed throughout the coating (before leaching) that was formed on the tinplate substrate. In contrast, there was no tin present in the coating formed on the steel substrate (before leaching). Similarly, in the coatings that were formed by first applying a coating of a powder mixture containing primarily aluminum powder and a minor amount of iron powder to the surfaces of the substrates, then heating the coated substrates to react the aluminum with the iron and cause significant diffusion of the aluminum into the surface of the substrate and before leaching the excess aluminum out of the surfaces of the substrate in a leaching bath (e.g., an aqueous bath containing about 20% by weight NaOH), the Quantitative Electron Probe Microanalysis found about 7.3% by weight tin in the pyrophoric layer (before leaching) formed on the tinplate substrate and no tin anywhere in or on the coating formed on the steel substrate (i.e., before leaching). Further, in the pyrophoric layer (before leaching) formed on the tinplate substrate (described immediately above) the tin was concentrated in a surface layer (i.e., layer at the surface of the pyrophoric layer that was in contact with the surrounding atmosphere) that extended down about 20–25% of the thickness of the overall pyrophoric layer. In the remainder of the pyrophoric layer, there was very little tin present.

When the pyrophorically activated steel bodies are subjected to leaching in a leaching bath (e.g., an aqueous bath containing about 20% by weight NaOH) that contains a stannous salt, elemental tin is deposited in the pyrophoric layer. Studies (e.g., x-ray maps) have shown that a substantial amount of the elemental tin is present throughout the pyrophoric layer. In addition, there is a thin layer (i.e., about 10% of the overall thickness of the pyrophoric layer) on the surface of the pyrophoric layer (i.e., the surface that is in contact with the surrounding atmosphere) where the concentration of elemental tin is significantly greater than the concentration of elemental tin in the remainder of the pyrophoric layer.

Apparently, the presence of a very thin coating of tin on a steel substrate (i.e., about 0.0058 mil tin on a 1 mil thick steel substrate or 0.0088 mil tin on a 1.5 mil thick steel substrate) has a pronounced effect on the morphology and composition of the iron aluminide coatings that are formed on the surfaces of the substrate.

Specifically, the presence of the initial tin layer on the steel substrate results in an iron aluminide coating (i.e., after the coating and leaching steps) that has greater porosity than an otherwise identical coating formed on a normal uncoated steel substrate. In addition, the pyrophoric coatings formed on the tinplate substrates have tin either distributed uniformly throughout the coating (i.e., in the coatings formed by applying a metal powder mixture containing primarily aluminum and iron powders to the surfaces of the substrate and then heating the coated substrate to an elevated temperature to cause reaction between the iron and aluminum and slight diffusion of the aluminum into the substrate before leaching the excess aluminum out of the coating) or an accumulation of tin on the coating surface (i.e., in the coatings formed by coating the substrate surfaces with a metal powder mixture containing primarily aluminum powder with a minor amount of iron powder and then heating the coated substrate to an elevated temperature to cause reaction between the aluminum and the iron and significant diffusion of the aluminum into the surface of the substrate before leaching the aluminum out of the coating). The increased porosity in the activated coating on tinplate permits greater access of air to its surface during the oxidation of the coating (i.e., reaction of the pyrophoric coating with air) which, in turn, results in intense and uniform oxidation of the coating with heat liberation that greatly exceeds that of the substantially less porous coatings formed on normal uncoated steel substrates.

When the tinplate substrate is activated by applying a coating of approximately equal amounts of aluminum powder and iron powder and then heating the coated substrate in an inert atmosphere to react the aluminum powder with the iron powder to form iron aluminides and promote slight diffusion of the aluminum into the tinplate substrate, it is believed that the very thin coating of tin on the surface of the tinplate substrate combines with some of the iron and forms a uniform distribution of an Sn—Fe intermetallic with a concentration of from about 0.1 to 2.0% by weight Sn throughout the iron-aluminide coating (i.e., the pyrophoric layer). In a preferred embodiment of the present invention, the iron-aluminide coating contains from about 0.1 to 1.0% by weight Sn distributed throughout the iron-aluminide coating. In a highly preferred embodiment of the present invention, the iron-aluminide coating contains from about 0.2 to 0.8% by weight Sn distributed throughout the iron-aluminide coating.

In contrast, when the tinplate substrate is activated by applying a coating of a powder mixture containing aluminum powder and iron powder, where the amount by weight of the aluminum powder in the mixture is much greater than the amount of iron powder (e.g., 88% by weight aluminum and 12% by weight iron), and then heating the coated substrate in an inert or reducing atmosphere to react the aluminum powder with the iron powder and cause a significant diffusion of the aluminum into the tinplate substrate, it is believed that the very thin coating of tin on the surface of the tinplate combines with some of the iron to form an Sn—Fe intermetallic which is primarily concentrated at the surface (i.e., the surface of the pyrophoric layer that is in contact with the surrounding atmosphere)of the aluminide coated tinplate. In a preferred embodiment of the present invention, the pyrophoric layer of the activated tinplate body (i.e., tinplate activated by the process described in this paragraph) contains from about 2 to 10% by weight tin (i.e., about 2 to 10% by weight tin based on the overall weight of the pyrophoric layer). In a highly preferred embodiment of the present invention, this pyrophoric layer contains from about 3 to 8% by weight tin(based on the overall weight of the pyrophoric layer).

Since the tin in the pyrophoric layer described in the previous paragraph is concentrated in a surface layer that composes only a portion of the overall pyrophoric layer, the concentration of tin in that surface layer may be significantly higher than the concentrations described above (i.e., from 2 to 10% by weight based on the overall weight of the pyrophoric layer). It is believed that the concentrations of tin in the surface layer of these pyrophoric bodies can be from about 8–30% by weight of the surface layer. As discussed earlier, the tin is present as a tin-iron intermetallic in the pyrophoric layers on activated tinplate, rather than as elemental tin in the pyrophoric layers on activated steel (i.e., elemental tin deposited in the pyrophoric layer from the stannous salt in the leaching bath).

Continuous Production of Activated Tinplate

FIG. 1 is a schematic of a preferred method of continuously producing the activated tinplate of the present invention. FIG. 1 shows a production line 100 having a number of stations through which a coil of precleaned 0.0015 inch thick tinplate 104 with a tin coating thickness of about 0.009 mils is uncoiled at 102 and continuously moved to produce a product of pyrophoric tinplate. The coating solution 110 in the tank at station 108 is composed of pure atomized aluminum powder dispersed in a solution of acetone and acrylate binder. The concentration of the aluminum is adjusted to give a dry coating weight on the tinplate of about 8 milligrams per square centimeter. Upon leaving the coating station, the coated tinplate is moved through a furnace 112 heated to 725° C. to cause reaction and diffusion of the aluminum into the tinplate surface. The diffusion coated tinplate is next cooled and the aluminum leached out in a hot water solution containing 20% sodium hydroxide at station 116. The leached tinplate is rinsed in water in tanks 117, 118 and 119 and dried in a nitrogen or argon atmosphere at station 120 after which it passes into another nitrogen or argon containing chamber 122 for stamping or slitting into elements. The final thickness of the now activated tinplate is 3 mils.

Alternative Embodiment of the Invention

Although the previous discussion in the present patent application is directed to the use of tin-coated steel or iron as the substrate for an activated metal body, the present invention also includes an embodiment where the "substrate" is tin-coated iron or steel powder. For example, the same type of process that is used to prepare an activated coating on tin-coated wire, mesh or foil can be used to prepare an activated coating on iron or steel powder that bears a very thin coating of tin. The tin-coated iron or steel powder is first cleaned (e.g., by dipping in a solvent or heat cleaning), if necessary, and then coated with aluminum powder or a mixture of aluminum powder and at least one other metal powder in a liquid (e.g., a binder or binder/solvent system). After the metal powder coating is formed on the surface of the tin-coated iron or steel powder, the powder is heated in an inert atmosphere to cause the aluminum powder to react with the iron and form either (1) an iron aluminide coating on the surface of the iron or steel powder particles or (2) if the iron or steel powder particles completely react with the aluminum, solid particles of iron aluminide. After the heating step, the powder particles are subjected to leaching in a leaching bath to remove a portion of the aluminum in the iron aluminide. After the leaching step, the activated particles are washed in water and then stored in an environment that is substantially oxygen-free until they are to be used.

It is believed that the use of tin-coated iron or steel powders will greatly reduce the amount of oxidation that occurs when uncoated iron or steel powders are used as the substrate. With uncoated iron or steel powders, the tendency for the powders to oxidize before the iron aluminide is formed and during the leaching and washing steps is very great. As discussed earlier in this patent application, this premature oxidation results in activated bodies with reduced heat energy outputs. Therefore, the uncoated iron or steel powders must be processed in special environments to minimize the amount of oxidation that occurs before the iron aluminide is formed and expensive stannous salts must be added to the leaching bath to reduce the amount of oxidation that occurs during leaching. All of these problems can be overcome by using tin-coated iron or steel powders as the starting material. Moreover, the use of tin-coated iron or steel powders permits the economical production of activated iron or steel powders that were heretofore unavailable, either due to processing difficulties or exorbitant cost.

The tin-coating on the tin-coated iron or steel powders can be formed by any technique which will produce a relatively thin layer of tin on the surface of each iron or steel powder particle. For example, one preferred method of forming such a tin coating is to add the iron or steel powder to an aqueous solution of dilute sodium hydroxide containing sodium stannite or stannate to form a mixture and then agitating the mixture. This will form a very thin film of tin on the surface of each iron or steel powder particle. The solution of dilute sodium hydroxide containing sodium stannite or stannate can be formed by dissolving stannous chloride in a dilute solution of sodium hydroxide in water, preferably at a slightly elevated temperature. The formation of a thin layer of tin on iron or steel powder particles can be achieved through many techniques that are within the skill of those working in this art and is not considered to be part of the present invention.

The following examples are intended to illustrate several of the preferred embodiments of the present invention and should not be considered as limiting the scope of the invention.

EXAMPLE 1

Samples of 0.0022 inch thick tinplate foil (produced from ¾ lb. tinplate foil 0.0022", from Teledyne Rodney Metals, coating weight designation no.75) having a tin coating thickness of 0.013 mils and samples of precleaned 0.0022 inch thick uncoated steel foil (steel foil 0.0022", from Teledyne Rodney Metals) were identically dip coated two times in a mixture containing 296 grams of aluminum powder (irregular shaped 5 micron size particles, #400 Atomized Aluminum Powder, from Reynolds Aluminum) dispersed in 44 grams of a lacquer composed of 97% by weight acetone and 3% by weight nitrocellulose. The samples were permitted to air dry between each coating step.

The coated samples were then placed on a conveyor belt and passed through an electric furnace which was held at a temperature of 800° C. The atmosphere in the furnace was hydrogen gas and the residence time of the samples in the furnace was about 5 minutes. After the samples were cooled, visual inspection of the tinplated samples showed that their surfaces were very smooth while the surfaces of the steel samples were rough. Both sets of samples were then placed in an aqueous solution held at 80 to 95° C. containing 20 percent by volume sodium hydroxide to selectively leach out the aluminum. After the leaching step, all of the samples were thoroughly rinsed in water and then visually examined while they were still wet. The tinplate samples were light gray indicating that there was no oxidation of their surface. The steel samples were black indicating that they were partially oxidized.

The samples were then dried and immediately placed on a paper towel to determine how long they emitted heat. The tinplate samples charred the paper towel and emitted heat for a total time of 22 seconds. The steel specimens also charred the paper towel but emitted heat for only 15 seconds. Radiometric measurements on the samples showed that the temperature of both the tinplate samples and the steel samples exceeded 260° C.

Although the applicant does not wish to be bound by theory, it is believed that the leached steel samples emitted heat for a shorter time because the steel partially oxidized during the leaching and rinsing operation and the iron oxide formed reduced the amount of active iron that was available to exothermically react with the oxygen in the air. The tin in the tinplate samples protected them from oxidation and enabled them to emit heat for a longer time.

The oxidation of the steel during the leaching and rinsing operation can be reduced or largely prevented by adding a tin salt to the leaching and rinsing baths, as taught in commonly owned U.S. Pat. No. 4,435,481 which issued on Mar. 6, 1984, the entire disclosure of which is expressly incorporated herein by reference. However, this tin salt is expensive. Therefore, by using tin-plated steel as the substrate, the need for the tin salt in the leaching bath is eliminated and the activated metal can be produced at a significantly reduced cost.

The ¾ lb. tinplate foil, 0.0022" from Teledyne Rodney Metals (coating weight designation No.75) has 0.375 lb. of tin per 435.6 sq. ft. of the foil with tin coating thickness of 0.045 mil. The original thickness of the tinplate is 0.0077" with a 0.045 mil thick tin coating. The No.75 type tinplate is then rolled to the thicknesses referred to in this Example and the other Examples of this patent application. For the 0.0022" thick tinplate foil used in this Example, the thickness of the tin coating is about 0.0128 mil. For a 1 mil thick tinplate foil produced from No.75 type tinplate, the tin coating thickness would be about 0.0058 mils. For a 1.5 mil thick tinplate foil produced from No.75 type tinplate, the tin coating thickness would be about 0.0088 mils. The tin coating weights for tinplate can be varied from No.0.05 to 135 (i.e., from 0.025 pounds of tin per 435.6 sq. ft. of 0.0077" thick tinplate to 0.675 pounds of tin per 435.6 sq. ft. of 0.0077" thick tinplate). When the thickness of the 0.0077" thick tinplate is reduced by rolling, the thickness of the tin coating is reduced proportionately.

EXAMPLE 2

Samples of 0.0059 inch thick tinplate foil (Electrolytic Tinplate (ETP) 0.2 lb., 0.0059", from U.S. Steel Group, Division of USX Corporation) having a 0.02 mil thick tin coating and samples of precleaned steel foil (Black plate (BP), 0.0075", from U.S. Steel Group, Division of USX Corporation) having a thickness of 0.0075 inches were identically dip coated two times in a mixture containing 296 grams of aluminum powder (spherical 15 micron size, Grade S392 (spherical) Aluminum powder, from Reynolds Aluminum) dispersed in 40 grams of a lacquer composed of 95% by weight acetone and 5% by weight acrylate.

The samples were then placed on a belt conveyor and passed through an electric furnace which was held at a temperature of 810° C. The atmosphere in the furnace was hydrogen gas and the residence time of the samples in the furnace was about 5 minutes. After the samples were cooled, visual examination of the samples showed that their surfaces were smooth and gray in color. The tinplate samples were a lighter gray than the steel samples.

A sample of the aluminide coated tinplate, a sample of the aluminide coated steel and a sample of uncoated tinplate (i.e., the same 0.0059 inch thick tinplate used as the substrate for the aluminide coated sample) were placed on a hot plate heated to 343° C. for a total time of three minutes. Examination of the samples after the heating step showed that the surface of the uncoated tinplate had oxidized but the surfaces of the aluminide coated tinplate and the aluminide coated steel did not oxidize (i.e., there was no change in the appearance of the surface).

A sample of the aluminide coated tinplate and a sample of the aluminide coated steel were placed in a water solution containing 3% by weight sodium chloride and 0.3% by weight hydrogen peroxide and held at 25° C. visual examination of the samples after this corrosion test revealed that the aluminide coated tinplate displayed no rusting after one hour in the solution. In contrast, the aluminide coated steel displayed moderate to severe rusting after one hour in the solution.

A sample of the aluminide coated tinplate and a sample of the aluminide coated steel were each placed in a water solution containing 20% by weight of sodium hydroxide at 90° C. until the rate of gas evolution from the samples tapered off, which indicated that the leaching step was complete (or nearly complete). The samples were then removed from the solution, rinsed in water and dried. The samples were then evaluated for heat output.

The aluminide coated tinplate sample, which required a 3 minute leaching time to complete the leaching step, became hot after exposure to air. In contrast, the aluminide coated steel sample, which only required a 1 minute leaching time to complete the leaching step, became only slightly warm after exposure to air. This indicates that the amount of aluminide formed on the steel sample was much less than the amount of aluminide that was formed on the tinplate sample, even though the amount of aluminum powder that was originally coated onto the surface of the steel sample should have been the same as the amount that was originally coated on the tinplate sample.

EXAMPLE 3

Several samples of 0.002 inch thick steel foil (Steel Foil 0.002", from Teledyne Rodney Metals) and 0.002 inch thick tinplate foil (produced from Tinplate foil ¾ lb. 0.002", from Teledyne Rodney Metals) having a 0.01 mil thick coating of tin were cleaned by dipping in acetone.

A coating of 7 mg of aluminum was applied to each square centimeter of steel and tinplate surface by dipping the cleaned samples in a solution containing 148 grams of irregular aluminum (5 micron size, #400 (Atomized Aluminum Powder), from Reynolds Aluminum) dispersed in 65 grams of a binder composed of 95 grams of acetone and 5 grams of an acrylate resin (ethyl methacrylate copolymer, Acryloid B-72, from Rohm and Haas).

The coated samples were placed in a furnace in a hydrogen atmosphere at 680° C. for fifteen seconds to enable diffusion of the aluminum into the surface of the steel and tinplate to form aluminide coatings on the surface of the steel and tinplate substrates.

The aluminide coated samples were then leached in a water solution containing 20% by weight sodium hydroxide at 90 to 95° C. to selectively remove the aluminum. The samples were held in the leaching bath for about six minutes. After the leaching step, the samples were thoroughly rinsed in water and dried in argon while fixtured in place on a test rig. After checking to make sure that the samples were thoroughly dry, air at a flow rate of 6 ft/sec was directed on the samples. The samples self-ignited in the air stream and emitted a quantity of heat due to the heat of oxidation of the activated surfaces. A radiometer and recorder were used to measure the heat output from each surface. Both the temperature and time were recorded. Table 1 indicates the heat output as measured by temperature and time (i.e., temperature displayed at the number of seconds indicated from the initial ignition of the sample) for the average of four samples of activated steel foil and four samples of activated tinplate foil. The average peak temperature was also recorded. The average peak temperature for the activated tinplate was 695° C. and the average peak temperature for the activated steel was 679° F.

TABLE 1

| Temperature ° F. | Tinplate (sec) | Steel (sec) |
| --- | --- | --- |
| 600 | 0.9 | 0.64 |
| 500 | 2.1 | 1.9 |
| 400 | 7 | 6 |
| 200 | 10.2 | 9.2 |

As shown by the data in Table 1, the activated tinplate samples emitted heat for a longer time than the activated steel samples. In addition, the activated tinplate samples also achieved a higher peak temperature than the activated steel samples.

EXAMPLE 4

Coils of 1.5 mil thick steel foil (Steel Foil 0.0015", from Teledyne Rodney Metals) and 1.5 mil thick tinplate foil (produced from ¾ lb. Tinplate Foil 0.0015", from Teledyne Rodney Metals) were coated in a production line that was very similar to the production line shown in FIG. 1 and described earlier in the section entitled "Continuous Production of Activated Tinplate". The powder mixture used to coat the steel and tinplate coils contained 88% aluminum and 12% iron to provide a final dry coating weight of 8.5 mg/cm$^2$ on the steel and tinplate substrates. Several samples of the coated steel and tinplate substrates were leached for five minutes in an aqueous solution containing 20% by weight sodium hydroxide heated to 180° F. by a heating device. After the five minute leaching step at 180° F., the solution was removed from the heating device and permitted to cool in ambient air with the samples remaining in the solution. Samples were removed from the cooled solution at time intervals of 1, 10, 30 and 60 minutes from the time the solution was removed from the heating device. After the samples were removed from the leaching solution, they were rinsed and dried and tested for heat output. Table 2 indicates the relative heat energies displayed by the samples where the samples are identified by their withdrawal times from the leaching solution. The values for the heat energy are given in area units because the values represent the area under the curve that was produced when a temperature versus time profile was plotted from the data that was generated for each of the samples in a heat output test. The data shows the gradual loss of energy of the activated steel due to oxidation in the leaching solution and the preservation of energy of the activated tinplate due to the galvanic protection provided by the small amount of tin present in the leached tinplate.

TABLE 2

| Time (min) | Heat Energy (cm$^2$) for Activated Tinplate | Heat Energy (cm$^2$) for Activated Steel |
| --- | --- | --- |
| 1 | 2184 | 2082 |
| 10 | 2412 | 1946 |
| 30 | 2354 | 1946 |
| 60 | 2347 | 1868 |

EXAMPLE 5

Samples of both coated tinplate and coated steel foil cut from the coated coils that were produced in Example 4 were leached in an aqueous solution containing 20% by weight sodium hydroxide and 0.5% by weight stannous chloride dihydrate at 180° F. for 5 minutes. The tin salt was used to prevent the oxidation of the steel substrate in the leaching solution.

The samples were removed from the leaching solution, rinsed in water and then dried. The heat output of the dried samples was measured with a radiometer and recorder. Both the temperature and time were recorded. Table 3 shows the data obtained from this test. The values shown in Table 3 are the average of two samples each of the activated tinplate and the activated steel.

As shown in Table 3, the activated tinplate reached a higher peak temperature than the activated steel and maintained a high temperature (e.g., about 600° C. or greater) for a longer time than the activated steel even when a tin salt was used in the leaching bath.

TABLE 3

| Time (sec) | Temperature (° C.) Activated Tinplate | Temperature (° C.) Activated Steel |
| --- | --- | --- |
| 0.2 | 500 | 460 |
| 0.3 | 700 | 510 |
| 0.6 | 738 | 700 |
| 0.9 | 700 | 650 |
| 1.0 | 690 | 630 |
| 1.2 | 680 | 600 |
| 1.8 | 650 | 510 |
| 3.8 | 590 | 460 |
| 4.4 | 595 | 460 |
| 5.0 | 600 | 460 |
| 6.2 | 482 | 490 |
| 6.4 | 482 | 490 |
| 7.0 | 400 | 500 |
| 8.0 | 300 | 450 |
| 8.4 | 260 | 400 |
| 10.0 | 215 | 250 |

EXAMPLE 6

Samples of 1 mil thick tinplate (Tinplate foil 0.001", Teledyne Rodney Metals) and samples of 1 mil thick steel foil (Steel foil 0.001", Teledyne Rodney Metals) which had been heat cleaned by heating the as received tinplate and steel to a temperature of 400° C. for six hours in a hydrogen atmosphere, were coated with a slurry containing 2382 grams of a mixture composed of 44.9% by weight iron powder (1–5 microns (Fe), 51640, from ISP (International Speciality Products)), 44.9% by weight aluminum powder (3 micron particle size, Valimet H-3 from Valimet Co.), 9.9% by weight copper powder (5 micron particle size, C-1133 from Cerac Co.) and 0.3% by weight boron powder (Amorphous Boron from 5B Boron Corp.) and 415 grams of a solvent system composed of 95% by weight Acetone and 5% by weight B-72 (ethyl methacrylate copolymer), by dipping the samples in the slurry and then allowing the samples to air dry. The final dry coating weight was 14.4 mg/cm$^2$ and the thickness of the samples after coating was about 5.0 mils.

The coated samples were then placed on a belt conveyor and passed through an electric furnace which was held at a temperature of 800° C. The atmosphere in the furnace was hydrogen gas and the residence time of the samples in the furnace was about 5 minutes. After the coated samples had cooled to room temperature, they were rolled by passing the coated samples through the bite of two smooth, hardened steel rolls (roll diameter about 2.0 inches) under moderate pressure, to compact the surface of the samples. After the rolling step, the samples were visually examined. The visual examination showed that the surface of the coated tinplate was smoother and more uniform in color than the surface of the coated steel, which had brown discolorations. The thickness of the coated tinplate after rolling was about 4.5–4.6 mils while the thickness of the coated steel after rolling was about 4.8–4.9 mils.

Samples of each of the coated materials (both rolled and unrolled) were leached for 6 minutes in an aqueous solution containing 20% by weight of sodium hydroxide at 180° F. and then rinsed, dried and tested for heat output. The results of the heat output tests are summarized in Table 4.

TABLE 4

| Sample | Thickness | Peak Temperature | Heat Intensity (no. of seconds at >400° C.) |
|---|---|---|---|
| Rolled Tinplate | 4.6 mil | 839° C. | 6.0 |
| Rolled Tinplate | 4.5 mil | 813° C. | 5.8 |
| Rolled Steel | 4.9 mil | 830° C. | 5.7 |
| Rolled Steel | 4.8 mil | 852° C. | 5.2 |
| Unrolled Tinplate | 5.0 mil | 800° C. | 6.0 |
| Unrolled Tinplate | 5.0 mil | 785° C. | 6.8 |
| Unrolled Steel | 5.0 mil | 820° C. | 5.6 |
| Unrolled Steel | 5.0 mil | 833° C. | 5.2 |

The results shown in Table 4 demonstrate that the coated tinplate had a better external appearance and a better heat output (from an intensity standpoint). In addition, the coated tinplate (i.e., after the heating step) could be rolled to a slightly lower thickness than the coated steel. This data indicates that the activated tinplate will produce a better decoy material than the activated steel.

EXAMPLE 7

A continuous strip of 1 mil thick steel foil (Steel foil 0.001", Teledyne Rodney Metals) was fed from a coil to a coating bath. The steel foil was cleaned by dipping it in acetone before the steel foil was fed into the coating bath. The coating bath contained iron powder (1–5 micron (Fe) 51640, International Specialty Products), aluminum powder (3 micron particle size, Valimet H-3, Valimet Co.), copper powder (5 micron particle size C-1133, Cerac Co.) and boron powder (Amorphous boron 5B, Boron Corp.) in a solvent/binder system composed of 95% by weight acetone and 5% by weight of an acrylate resin (ethyl methacrylate copolymer, Acryloid B-72, from Rohm and Haas).

A coating of 16 mg of a powder mixture composed by weight of 47.2% Fe, 47.2% Al, 5.2% Cu and 0.4% B was applied to each square centimeter of the steel foil surface by dipping the cleaned foil in the coating bath.

The coated foil was placed in a furnace in a hydrogen atmosphere at 760° C. for about fifteen seconds to form an aluminide coating on the surface of the steel foil and to promote slight diffusion of the aluminum into the surface of the steel substrate. The aluminide coating weight was 15 mg/cm$^2$.

The aluminide coated foil was then leached in a water solution containing 20% by weight sodium hydroxide and 0.2% by weight of stannous chloride dihydrate at 180 to 190° F. to selectively remove the aluminum. The stannous chloride dihydrate was needed to prevent the activated steel from oxidizing during the leaching procedure. The coated steel foil was held in the leaching bath for about five minutes. After the leaching step, the coated steel foil was thoroughly rinsed in water and dried in a nitrogen atmosphere. The average activated foil thickness for the steel foil was 4.9 mils. Three samples were cut from the strip of coated steel foil and each was fixtured in place on a test rig. After checking to make sure that the samples were thoroughly dry, air at a flow rate of 6 ft/sec was directed on the samples. The samples self-ignited in the air stream and emitted a quantity of heat due to the heat of oxidation of the activated surfaces. A radiometer and recorder were used to measure the heat output from each surface. Both the temperature and time were recorded. Table 5 indicates the heat energies displayed by the samples. The values for the heat energy are given in area units because the values represent the area under the curve that was produced when a temperature versus time profile was plotted from the data that was generated for each of the samples in the heat output test described above. The peak temperature for each sample was also recorded. The average peak temperature for the activated steel was 799° C. Further, the amount of time that each sample displayed a temperature of more than 400° C. is also shown in Table 5.

TABLE 5

| Sample | Heat Energy (cm$^2$) | ΔT (seconds > 400° C.) |
|---|---|---|
| 1 | 2557 | 3.6 |
| 2 | 2395 | 3.4 |
| 3 | 2337 | 3.3 |

EXAMPLE 8

A continuous strip of 1 mil thick tinplate foil (Tinplate 0.001", Teledyne Rodney Metals, 0.0058 mil thick coating of tin) was fed from a coil to a coating bath. The tinplate foil was cleaned by dipping it in acetone before the tinplate foil was fed into the coating bath. The coating bath contained iron powder (1–5 micron (Fe) 51640, International Specialty Products), aluminum powder (3 micron particle size, Valimet H-3, Valimet Co.), copper powder (5 micron particle size C-1133, Cerac Co.), and boron powder (Amorphous boron, 5B Boron Corp.) in a solvent/binder system composed of 95% by weight acetone and 5% by weight of an acrylate resin (ethyl methacrylate copolymer, Acryloid B-72, from Rohm and Haas).

A coating of 16 mg of a powder mixture composed by weight of 47.2% Fe, 47.2% Al, 5.2% Cu and 0.4% B was applied to each square centimeter of the tinplate foil surface by dipping the cleaned foil in the coating bath.

The coated foil was placed in a furnace in a hydrogen atmosphere at 760° C. for about fifteen seconds to form an aluminide coating on the surface of the tinplate foil and to promote slight diffusion of the aluminum into the surface of the tinplate substrate. The aluminide coating weight was 15 mg/cm$^2$.

The aluminide coated foil was then leached in a water solution containing 20% by weight sodium hydroxide at 180 to 190° F. to selectively remove the aluminum. The coated tinplate foil was held in the leaching bath for about five minutes. After the leaching step, the coated tinplate foil was thoroughly rinsed in water and dried in a nitrogen atmosphere. The average activated foil thickness for the tinplate foil was 4.8 mils. Three samples were cut from the strip of coated tinplate foil and each was fixtured in place on a test rig. After checking to make sure that the samples were thoroughly dry, air at a flow rate of 6 ft/sec was directed on the samples. The samples self-ignited in the air stream and emitted a quantity of heat due to the heat of oxidation of the activated surfaces. A radiometer and recorder were used to measure the heat output from each surface. Both the temperature and time were recorded. Table 6 indicates the heat energies displayed by the samples. The values for the heat energy are given in area units because the values represent the area under the curve that was produced when a temperature versus time profile was plotted from the data that was generated for each of the samples in the heat output test described above. The peak temperature for each sample was also recorded. The average peak temperature for the activated tinplate was 924° C. Further, the amount of time that each sample displayed a temperature of more than 400° C. (i.e., ΔT) is also shown in Table 6.

TABLE 6

| Sample | Heat Energy ($cm^2$) | ΔT (seconds > 400° C.) |
|---|---|---|
| 1 | 2894 | 4 |
| 2 | 2946 | 4 |
| 3 | 2873 | 3.9 |

The data shown in Tables 5 and 6 demonstrate the appreciable improvement of activated tinplate over steel in terms of peak temperature, heat energy output and ΔT values. These test results were confirmed in field tests in which more than a thousand foil elements per cannister of each material (i.e., the activated tinplate and activated steel) were dispersed from five (5) canisters into the air and their radiant intensity (heat output) in Watts per Steradian ($WSr^{-1}$) measured by focusing radiometers. Watts per Steradian ($WSr^{-1}$) is defined as the radiant flux per unit solid angle. The data collected from the cannister field tests is shown in Table 7. The average total output intensity and peak intensity of the five (5) canisters containing activated tinplate foil surpassed that of the five (5) canisters containing the activated steel foil. In addition, the superior activity of the activated tinplate is shown by its faster rise time to peak radiant intensity than the activated steel.

TABLE 7

| | Average Heat Output in $WSr^{-1}$ | |
|---|---|---|
| Time (sec.) | Activated Tinplate | Activated Steel |
| 0.25 | 200 | 200 |
| 0.50 | 1000 | 800 |
| 0.75 | 1390 | 1190 |
| 1.00 | 1410 | 1250 |
| 1.25 | 1420 | 1280 |
| 1.50 | 1340 | 1220 |
| 1.75 | 1200 | 1150 |
| 2.00 | 1050 | 1050 |
| 2.25 | 950 | 950 |
| 2.50 | 850 | 850 |
| 2.75 | 700 | 700 |
| 3.00 | 620 | 620 |
| 4.00 | 350 | 350 |
| 5.00 | 150 | 190 |
| 6.00 | 50 | 60 |

EXAMPLE 9

A continuous strip of 1.5 mil thick steel foil (Steel foil 0.0015 mil, Teledyne Rodney Metals) was fed from a coil to a coating bath. The steel foil was cleaned by dipping it in acetone before the steel foil was fed into the coating bath. The coating bath contained iron powder (1–5 micron (Fe) 51640, International Specialty Products) and aluminum powder (3 micron particle size, Valimet H-3, Valimet Co.) in a solvent/binder system composed of 95% by weight acetone and 5% by weight of an acrylate resin (ethyl methacrylate copolymer, Acryloid B-72, from Rohm and Haas).

A coating of 8.7 mg of a powder mixture composed by weight of 12% Fe and 88% Al was applied to each square centimeter of the steel foil surface by dipping the cleaned foil in the coating bath.

The coated foil was placed in a furnace in a hydrogen atmosphere at 725° C. for about fifteen seconds to cause reaction of the aluminum with the iron and diffusion of the aluminum into the surface of the steel substrate. The aluminide coating weight was 8.5 $mg/cm^2$.

The aluminide coated foil was then leached in a water solution containing 20% by weight sodium hydroxide and 0.5% by weight of stannous chloride dihydrate at 180 to 190° F. to selectively remove the aluminum. The stannous chloride dihydrate was needed to prevent the activated steel from oxidizing during the leaching procedure. The coated steel foil was held in the leaching bath for about four minutes. After the leaching step, the coated steel foil was thoroughly rinsed in water and dried in a nitrogen atmosphere. The average activated foil thickness for the steel foil was 3.6 mils. Sixteen samples were cut from the strip of coated steel foil and each was fixtured in place on a test rig. After checking to make sure that the samples were thoroughly dry, air at a flow rate of 6 ft/sec was directed on the samples. The samples self-ignited in the air stream and emitted a quantity of heat due to the heat of oxidation of the activated surfaces. A radiometer and recorder were used to measure the heat output from each surface. Both the temperature and time were recorded. Table 8 shows the average heat energies displayed by the samples. The values for the heat energy are given in area units because the values represent the area under the curve that was produced when a temperature versus time profile was plotted from the data that was generated for each of the samples in the heat output test described above. The peak temperature for each sample was also recorded. The average peak temperature for the activated steel was 665° C. Further, the average amount of time that the samples displayed a temperature of more than 400° C. is also shown in Table 8.

TABLE 8

| Average Heat Energy ($cm^2$) (16 samples) | Average ΔT (seconds > 400° C.) |
|---|---|
| 2280 | 4.8 |

EXAMPLE 10

A continuous strip of 1.5 mil thick tinplate foil (tinplate foil 0.0015 mil, 0.0088 mil thick coating of tin, Teledyne Rodney Metals) was fed from a coil to a coating bath. The tinplate foil was cleaned by dipping it in acetone before the tinplate foil was fed into the coating bath. The coating bath contained iron powder (1–5 micron (Fe) 51640, International Specialty Products) and aluminum powder (3 micron particle size, Valimet H-3, Valimet Co.) in a solvent/binder system composed of 95% by weight acetone and 5% by weight of an acrylate resin (ethyl methacrylate copolymer, Acryloid B-72, from Rohm and Haas).

A coating of 8.7 mg of a powder mixture composed by weight of 12% Fe and 88% Al was applied to each square centimeter of the tinplate foil surface by dipping the cleaned foil in the coating bath.

The coated foil was placed in a furnace in a hydrogen atmosphere at 725° C. for about fifteen seconds to cause reaction of the aluminum with the iron and diffusion of the aluminum into the surface of the tinplate substrate. The aluminide coating weight was 8.5 mg/cm$^2$.

The aluminide coated foil was then leached in a water solution containing 20% by weight sodium hydroxide at 180 to 190° F. to selectively remove the aluminum. The coated tinplate foil was held in the leaching bath for about four minutes. After the leaching step, the coated tinplate foil was thoroughly rinsed in water and dried in a nitrogen atmosphere. The average activated foil thickness for the tinplate foil was 3.7 mils. Sixteen samples were cut from the strip of coated tinplate foil and each was fixtured in place on a test rig. After checking to make sure that the samples were thoroughly dry, air at a flow rate of 6 ft/sec was directed on the samples. The samples self-ignited in the air stream and emitted a quantity of heat due to the heat of oxidation of the activated surfaces. A radiometer and recorder were used to measure the heat output from each surface. Both the temperature and time were recorded. Table 9 shows the average heat energies displayed by the samples. The values for the heat energy are given in area units because the values represent the area under the curve that was produced when a temperature versus time profile was plotted from the data that was generated for each of the samples in the heat output test described above. The peak temperature for each sample was also recorded. The average peak temperature for the activated tinplate was 716° C. Further, the amount of time that each sample displayed a temperature of more than 400° C. is also shown in Table 9.

TABLE 9

| Average Heat Energy (cm$^2$) | Average ΔT (seconds > 400° C.) |
|---|---|
| 2916 | 5.6 |

The data shown in Tables 8 and 9 demonstrate the superior performance of the activated tinplate compared to the activated steel. Field tests were conducted with the activated tinplate foil of Example 10. Specifically, more than a thousand foil elements per cannister of the activated tinplate were dispersed from five (5) canisters into the air and their radiant intensity (heat output) in Watts per Steradian (WSr$^{-1}$) measured by focusing radiometers. The data collected from the field test is shown in Table 10. The average total output intensity and peak intensity of the five (5) canisters containing the activated tinplate foil were excellent, as was the rise time to peak radiant intensity.

TABLE 10

| Time (sec.) | Average Heat Output in WSr$^{-1}$ Activated Tinplate |
|---|---|
| 0.25 | 300 |
| 0.50 | 900 |
| 0.75 | 1240 |
| 1.0 | 1220 |
| 1.25 | 1150 |
| 1.50 | 1000 |
| 1.75 | 900 |
| 2.00 | 750 |
| 2.25 | 610 |

TABLE 10-continued

| Time (sec.) | Average Heat Output in WSr$^{-1}$ Activated Tinplate |
|---|---|
| 2.50 | 550 |
| 3.00 | 430 |
| 3.50 | 400 |
| 4.00 | 400 |
| 5.00 | 380 |
| 6.00 | 250 |

EXAMPLE 11

Five samples of activated tinplate were prepared by the method described in Example 6 except that the amount of time that the samples were rinsed in water was varied.

Five samples of activated steel were prepared by the method described in Example 7 except that the amount of time that the samples were rinsed in water was varied.

Groups of five samples of each type of material were rinsed in water for the times indicated in Table 11. After the rinsing step, the samples were tested in the same manner as the samples of Example 8. The average heat energy (cm$^2$), average peak temperature (° C.) and average ΔT (seconds samples were >400° C.) for each group of samples is shown in Table 11.

TABLE 11

| | Tinplate Substrate | | | Uncoated Steel Substrate | | |
|---|---|---|---|---|---|---|
| Time in water rinse (hours) | Average Heat Energy (cm$^2$) | Average Peak Temp. (° C.) | Average ΔT (seconds samples were >400° C.) | Average Heat Energy (cm$^2$) | Average Peak Temp. (° C.) | Average ΔT (seconds samples were >400° C.) |
| 0 | 2901 | 938 | 3.8 | 3102 | 861 | 4.4 |
| 2 | 2911 | 950 | 4.0 | 2891 | 971 | 3.9 |
| 5 | 2898 | 942 | 3.8 | 1257 | 478 | 1.2 |
| 9 | 2919 | 897 | 4.1 | 1243 | 451 | 1.0 |
| 22 | 1282 | 496 | 1.3 | 1143 | 394 | 0 |

While the invention has been particularly shown and described with reference to preferred embodiments thereof, it will be understood by those skilled in the art that various changes in form and details may be made without departing from the spirit and scope of the invention as defined in the appended claims.

What is claimed is:

1. A method of producing a pyrophoric body comprising the steps:

a) applying a dispersion or slurry of aluminum, or a mixture of aluminum and at least one material selected from the group consisting of iron, titanium, zirconium, boron, chromium, phosphorus, manganese, nickel, cobalt and copper, in a liquid to at least one surface of a body of iron or steel which is coated with a layer of tin, said layer of tin having a thickness of from about 0.003 mils to 0.10 mils, to form a coated body;

b) heating the coated body to an elevated temperature to diffuse the aluminum into the iron or steel and form an aluminide coated body; and c) leaching the aluminide coated body in an aqueous caustic solution to remove at least a portion of the aluminum from the aluminide coated body.

2. A method of producing a pyrophoric body comprising the steps:

a) applying a dispersion or slurry of aluminum, or a mixture of aluminum and at least one material selected from the group consisting of iron, titanium, zirconium, boron, chromium, phosphorus, manganese, nickel, cobalt and copper, in a liquid to a layer of tin which is located on at least one surface of a body of iron or steel to form a coating of the dispersion or slurry on the layer of tin, wherein said layer of tin has a thickness of from about 0.003 mils to 0.10 mils;

b) heating said coating to an elevated temperature to melt the aluminum and the tin and thereby form an aluminide layer on the at least one surface of the body of iron or steel; and c) leaching at least a portion of the aluminum from the aluminide layer by contacting the layer with an aqueous caustic solution.

3. The method of claim 1, wherein said liquid consists essentially of a binder and a solvent.

4. The method of claim 2, wherein said liquid consists essentially of a binder and a solvent.

5. The method of claim 3, wherein said solvent is an organic solvent.

6. The method of claim 4, wherein said solvent is an organic solvent.

7. The method of claim 3, wherein said solvent is water.

8. The method of claim 4, wherein said solvent is water.

9. A method of producing a pyrophoric body comprising the steps:

a) applying a dispersion or slurry of aluminum, or a mixture of aluminum and at least one material selected from the group consisting of iron, titanium, zirconium, boron, chromium, phosphorus, manganese, nickel, cobalt and copper, in a liquid to at least one surface of a body of iron or steel which is coated with a layer of tin, said layer of tin having a thickness of from about 0.003 mils to 0.10 mils, to form a coated body;

b) heating the coated body to an elevated temperature to diffuse the aluminum into the iron or steel and form an aluminide coated body; and c) leaching the aluminide coated body by contacting it with an aqueous caustic solution to remove at least a portion of the aluminum from the aluminide coated body, wherein said aqueous caustic solution does not contain any tin before being contacted with said aluminide coated body.

10. The method of claim 9, wherein said liquid consists essentially of a binder and a solvent.

11. The method of claim 10, wherein said solvent is an organic solvent.

12. The method of claim 10, wherein said solvent is water.

13. The method of claim 10, wherein said binder is polyvinyl alcohol and said solvent is a mixture of water and normal propanol.

14. The method of claim 9, wherein the composition of said liquid by weight is 2.5% polyvinyl alcohol, 47.5% water and 50% normal propanol.

15. The method of claim 1, wherein said body of iron or steel is a powder particle.

16. The method of claim 2, wherein said body of iron or steel is a powder particle.

17. The method of claim 9, wherein said body of iron or steel is a powder particle.

18. The method of claim 1, wherein said pyrophoric body is suitable for use as a decoy material for a heat seeking missile.

19. The method of claim 2, wherein said pyrophoric body is suitable for use as a decoy material for a heat seeking missile.

20. The method of claim 9, wherein said pyrophoric body is suitable for use as a decoy material for a heat seeking missile.

* * * * *